US006661416B2

(12) United States Patent

Muikaichi et al.

(10) Patent No.: US 6,661,416 B2

(45) Date of Patent: Dec. 9, 2003

(54) APPARATUS AND METHOD FOR DRAWING CHARACTER SEQUENCE USING FONT DATA WITH ANY DATA STRUCTURE

(75) Inventors: Masahiro Muikaichi, Neyagawa (JP); Kenji Izumi, Kadoma (JP); Satoshi Tsujimura, Kobe (JP)

(73) Assignee: Matsushita Electric Industrial Co., Ltd., Osaka-fu (JP)

( * ) Notice: Subject to any disclaimer, the term of this patent is extended or adjusted under 35 U.S.C. 154(b) by 398 days.

(21) Appl. No.: 09/745,582

(22) Filed: Dec. 21, 2000

(65) Prior Publication Data

US 2001/0005207 A1 Jun. 28, 2001

(30) Foreign Application Priority Data

Dec. 24, 1999 (JP) .......................................... 11-367167

(51) Int. Cl.[7] ................................................ G06T 15/00

(52) U.S. Cl. ....................................................... 345/467

(58) Field of Search ................................ 345/619, 467, 345/468, 469, 470, 471, 472

(56) References Cited

U.S. PATENT DOCUMENTS 5,586,241 A * 12/1996 Bauermeister et al. ...... 345/467
6,323,865 B1 * 11/2001 Colletti ...................... 345/467

FOREIGN PATENT DOCUMENTS

JP 6110888 4/1994

* cited by examiner

*Primary Examiner*—Phu K. Nguyen

(57) ABSTRACT

A character sequence drawing apparatus which stores font data and font processing functions for executing processes for using the font data. The font processing functions are, for example a rasterizer initialization function, a glyph-by-glyph pattern obtaining function, a glyph-by-glyph font metrics information obtaining function, and a common font metrics information obtaining function. The character sequence drawing apparatus receives, from an application program (AP), a piece of font access information that includes addresses of font data and a group of types of font processing functions, assigns a font ID to the piece of font access information, stores the font ID with correspondence to the piece of font access information, and sends the font ID to the AP. After this, the AP can issue a request to execute a drawing-related process (e.g., obtaining a character sequence width, obtaining height of a font, or drawing a character sequence) to the character sequence drawing apparatus, specifying a font ID. After receiving a request from the AP, the character sequence drawing apparatus identifies addresses of font processing functions based on the received request and piece of font access information corresponding to the specified font ID, and executes the functions.

15 Claims, 13 Drawing Sheets fig. 3

| | API NAME | INPUT PARAMETER | OUTPUT PARAMETER |
|---|---|---|---|
| 401 | RegisterFont | FONT ACCESS INFORMATION | FONT ID |
| 402 | DeleteFont | FONT ID | NONE |
| 403 | DrawText | DRAWING-OBJECT CANVAS ID<br>TEXT CONTEXT ID<br>DRAWING START COORDINATES (x,y)<br>CHARACTER SEQUENCE<br>CHARACTER SEQUENCE LENGTH | NONE |
| 404 | GetTextHeight | TEXT CONTEXT ID | FONT HEIGHT |
| 405 | GetTextWidth | TEXT CONTEXT ID<br>CHARACTER SEQUENCE<br>CHARACTER SEQUENCE LENGTH | CHARACTER SEQUENCE WIDTH |
| 406 | GetFontAddr | FONT LIBRARY FUNCTION NAME OR FONT DATA NAME | FONT LIBRARY FUNCTION ADDRESS OR FONT DATA ADDRESS |

fig. 4

| CONTENTS OF TEXT CONTEXT |
|---|
| TEXT COLOR |
| UNDERLINE FLAG |
| FRAME FLAG |
| OUTLINE FLAG |
| BACKGROUND FLAG |
| BOLDFACE/LIGHTFACE FLAG |
| FONT SIZE |
| FONT ID |

fig. 5

| | FONT LIBRARY FUNCTION TYPE | INPUT PARAMETER | OUTPUT PARAMETER |
|---|---|---|---|
| 501 | INITIALIZATION FUNCTION | NONE | NONE |
| 502 | CHARACTER CODE CONVERSION FUNCTION | CHARACTER SEQUENCE | INTERNAL CODE SEQUENCE |
| | | CHARACTER SEQUENCE LENGTH | INTERNAL CODE SEQUENCE LENGTH |
| 503 | COMMON FONT METRICS INFORMATION OBTAINING FUNCTION | FONT DATA ADDRESS | ASCENT |
| | | FONT SIZE | DESCENT |
| | | | AVERAGE WIDTH |
| 504 | CHARACTER-BY-CHARACTER FONT METRICS INFORMATION OBTAINING FUNCTION | FONT DATA ADDRESS | CHARACTER WIDTH |
| | | FONT SIZE | |
| | | INTERNAL CODE | |
| 505 | FONT PATTERN OBTAINING FUNCTION | FONT DATA ADDRESS | FONT PATTERN ADDRESS |
| | | FONT SIZE | FONT PATTERN WIDTH |
| | | INTERNAL CODE | FONT PATTERN HEIGHT |

APPARATUS AND METHOD FOR DRAWING CHARACTER SEQUENCE USING FONT DATA WITH ANY DATA STRUCTURE

BACKGROUND OF THE INVENTION

1. Field of the Invention

The present invention relates to a character sequence drawing apparatus. More particularly, the present invention relates to a character sequence drawing apparatus that draws a character sequence or executes a process related to character sequence drawing in response to a request from an application program.

2. Description of Related Art

Recently, as font-related techniques have developed, outline fonts that draw characters of any size with high quality or the like have been provided, as well as bitmap fonts. Also, various fonts or typefaces have been provided. Corresponding to the development of such fonts, Digital TVs, personal computers, printers or the like provide functions for drawing characters with various expressions using various fonts.

Conventionally, in personal computers or the like, operating systems (OS) provide application programs (AP) with character sequence drawing functions. When an AP requests a character sequence drawing specifying a character sequence and a font, an OS accesses font data corresponding to the requested font, obtains a glyph image, namely a dot pattern (hereinafter called a font pattern) of each character in the requested character sequence, and draws the font pattern on a screen. It should be noted here that the font data is information necessary for using a font and contains, for example, information indicating shapes of glyphs.

Conventional OSs can obtain a font pattern by accessing font data having a specific data format, or a specific data structure. Accordingly, when a piece of font data is to be used by an OS, the piece of font data needs to have a specific data structure that can be accessed by the OS.

In contrast, a character sequence outputting apparatus that can deal with a plurality of pieces of font data having any data structures has been disclosed (Japanese Laid-Open Patent No. 6-110888), which is intended to increase flexibility in creation of font data.

The character sequence outputting apparatus corresponds to a character sequence drawing function of conventional OS. The character sequence outputting apparatus includes a table that corresponds fonts with pieces of font data and font pattern expansion programs that expand the pieces of font data to create font patterns. Upon receipt of a character output instruction from outside, the character sequence outputting apparatus refers to the table to identify a font pattern expansion program and a piece of font data corresponding to a font specified in the instruction, generates a font pattern from the identified piece of font data using the identified font pattern expansion program, and sends the generated font pattern to a drawing apparatus, allowing the drawing apparatus to draw the font pattern.

Meanwhile, some fonts are proportional fonts in which each character has a different width. In case an AP can recognize, in drawing a character sequence using a proportional font, the width of each character and use the width for character decoration or in controlling the drawing of the background, the characters can be expressed with more variety.

In outline fonts, outline information used for forming a character, such as coordinates of lines constituting the character, needs to be rasterized to create a drawing font pattern. The drawing speed will be increased if the rasterizing can be done by a rasterizer, a hardware unit.

As described above, OSs are required to have functions for using various fonts in response to their characteristics.

The above character sequence outputting apparatus, however, can only generate font patterns from the font data, and does not have enough functions such as obtaining character width or controlling a rasterizer.

SUMMARY OF THE INVENTION

It is therefore an object of the present invention to provide a character sequence drawing apparatus that draws a character sequence with font data of any data structure and also executes various processes to make effective use of fonts in accordance with the characteristics of the fonts or the like.

The above object is fulfilled by a character sequence drawing apparatus comprising: a storage unit operable to store a plurality of pieces of font data and a plurality of font processing functions for using the plurality of pieces of font data; a font access information obtaining unit operable to obtain a piece of font access information which includes a group of addresses of font processing functions, from an application program; a request receiving unit operable to receive from the application program a request which is related to drawing of a character sequence; and a font processing function executing unit operable to identify one or more addresses of font processing functions which have been predetermined with correspondence to the received request among the group of addresses of font processing functions included in the piece of font access information, and respond to the received request by executing one or more font processing functions corresponding to the one or more addresses.

With the above construction, when the AP specifies a piece of font access information that includes a plurality of addresses of a plurality of font processing functions including a font pattern obtaining function, the character sequence drawing apparatus executes various processes (e.g., obtaining width of the character sequence) concerning the drawing of the character sequence in response to requests from the AP, using font processing functions whose locations are identified by the addresses. To make effective use of fonts, various font processing functions are used to execute processes related to the fonts by accessing the font data or the like. Since the AP can specify addresses of the font processing functions, the character sequence drawing apparatus can execute various font processing functions in accordance with requests from the AP. With this construction, the character sequence drawing apparatus need not determine a font processing function it should use in accordance with a font requested by the AP.

In the above character sequence drawing apparatus, the plurality of font processing functions may be classified into a plurality of function types, the storage unit may store one or more font processing functions for each of the plurality of function types, the piece of font access information may include one address for each of the plurality of function types, the font access information obtaining unit, for each obtainment of a piece of font access information, assigns a font ID to each obtained piece of font access information, holds the assigned font IDs and pieces of obtained font access information, and sends each font ID to the application program, wherein the font IDs correspond to the pieces of font access information on a one-to-one basis, the request receiving unit receives a font ID together with a request from the application program, and the font processing function executing unit identifies one or more addresses of font processing functions which have been predetermined with correspondence to the received request among a group of addresses of font processing functions included in a piece of font access information corresponding to the obtained font ID, and respond to the received request by executing one or more font processing functions corresponding to the one or more addresses.

With the above construction, when the AP sends a request related to drawing of a character sequence with specification of a font ID, the character sequence drawing apparatus executes one or more font processing functions corresponding to the specified font ID in response to the request. With this construction, the AP can specify a different font ID for each character sequence to allow the character sequence drawing apparatus to draw each character sequence with a different font.

In the above character sequence drawing apparatus, the storage unit may store one or more font pattern obtaining functions which are classified as a function type and each identify a font pattern based on a piece of font data and obtain the identified font pattern, each piece of font access information includes an address of a font pattern obtaining function in the storage unit, and when the request receiving unit receives a request to draw a character sequence, the font processing function executing unit draws the character sequence by identifying an address of a font pattern obtaining function based on the received request among a group of addresses of font processing functions included in a piece of font access information corresponding to the obtained font ID and executing the font pattern obtaining function corresponding to the identified address to obtain font patterns of characters included in the character sequence.

With the above construction, the AP previously sends a piece of font access information including an address of a font pattern obtaining function corresponding to a piece of font data regardless of the data structure of the piece of font data, and later sends a character sequence drawing request to the character sequence drawing apparatus so that the character sequence drawing apparatus can execute the font pattern obtaining function to obtain a font pattern, and draw the character sequence using a specific font.

In the above character sequence drawing apparatus, each piece of font data may contain common font metrics information that shows attributes common to a plurality of glyphs, two attributes among the attributes being an ascent and a descent, the storage unit stores one or more common font metrics information obtaining functions which are classified as a function type and each obtain common font metrics information by accessing a piece of font data, each piece of font access information includes an address of a common font metrics information obtaining function in the storage unit, and the font processing function executing unit identifies an address of a common font metrics information obtaining function based on the received request among a group of addresses of font processing functions included in a piece of font access information corresponding to the obtained font ID and executes the common font metrics information obtaining function.

With the above construction, the AP previously sends a piece of font access information including an address of a common font metrics information obtaining function corresponding to a piece of font data regardless of the data structure of the piece of font data, and later requests the character sequence drawing apparatus to return a height of the font or the like so that the character sequence drawing apparatus can execute the common font metrics information obtaining function to obtain attributes (e.g. an ascent and a descent) common to the glyphs of a specific font, obtain the height of the font or the like based on the attributes, and send the obtained height or the like to the AP.

In the above character sequence drawing apparatus, when the request receiving unit receives a request to obtain a height of a font, the font processing function executing unit may obtain the ascent and the descent by executing the common font metrics information obtaining function, calculates the height of the font based on the ascent and the descent, and sends a result of the calculation to the application program.

With the above construction, the AP can obtain the height of the font, and, for example, can adjust the distance between lines in the character sequence, based on the obtained height.

In the above character sequence drawing apparatus, each piece of font data may contain glyph-by-glyph font metrics information that shows attributes unique to the plurality of glyphs, wherein one of the attributes is a glyph width, the storage unit stores one or more glyph-by-glyph font metrics information obtaining functions which are classified as a function type and each obtain a glyph-by-glyph font metrics information by accessing a piece of font data, each piece of font access information includes address information which is either an address of a glyph-by-glyph font metrics information obtaining function in the storage unit or null values, and when it is possible for the font processing function executing unit to obtain an address of a glyph-by-glyph font metrics information obtaining function based on the received request among a group of addresses of font processing functions included in a piece of font access information corresponding to the obtained font ID, the font processing function executing unit executes the glyph-by-glyph font metrics information obtaining function corresponding to the obtained address.

With the above construction, when the AP intends to use a font that has a different characteristic for each glyph, such as a proportional font, the AP previously sends a piece of font access information including an address of a glyph-by-glyph font metrics information obtaining function corresponding to a piece of font data of the above font regardless of the data structure of the piece of font data, and later requests the character sequence drawing apparatus to return a width of the font or the like so that the character sequence drawing apparatus can execute the glyph-by-glyph font metrics information obtaining function to obtain information such as widths of the glyphs, obtain the width of the character sequence or the like based on the information, and send the obtained width or the like to the AP.

In the above character sequence drawing apparatus, one of the attributes shown by the common font metrics information may be an average width of the plurality of glyphs, when the request receiving unit receives a request to obtain a width of the character sequence, the font processing function executing unit judges whether the address information of the glyph-by-glyph font metrics information obtaining function in the font access information corresponding to the font ID obtained by the request receiving unit is the null values or not, when the address information is the null values, the font processing function executing unit executes the common font metrics information to obtain an average width of the plurality of glyphs, calculates a width of the character sequence based on the average width, and sends a result of the calculation to the application program, and when the address information is not the null values, the font processing function executing unit executes the glyph-by-glyph font metrics information obtaining function to obtain glyph widths of characters included in the character sequence, calculates a width of the character sequence based on the obtained glyph widths, and sends a result of the calculation to the application program.

With the above construction, when the AP intends to use a proportional font, the AP previously sends a piece of font access information in which an address of a glyph-by-glyph font metrics information obtaining function is set as the address information; and when the AP intends to use a fixed-pitch font, the AP previously sends a piece of font access information in which null values are set as the address information. The AP later requests the character sequence drawing apparatus to return a width of the character sequence, obtains the width from the character sequence drawing apparatus, and determine a range of drawing based on the obtained width.

In the above character sequence drawing apparatus, the storage unit may store one or more character code conversion functions which are classified as a function type and each output one or more internal codes corresponding to one or more input character codes, each font pattern obtaining function outputs a font pattern of a glyph which is identified when one of the one or more internal codes is input, each piece of font access information includes an address of a character code conversion function in the storage unit, when the request receiving unit receives a request to draw a character sequence, the font processing function executing unit obtains from the application program one or more character codes that represent a drawing-object character sequence, obtains one or more internal codes by executing a character code conversion function using the one or more character codes, and obtains a font pattern for each character included in the drawing-object character sequence by executing a font pattern obtaining function using each of the one or more internal codes.

With the above construction, the character sequence drawing apparatus does not receive character codes, but receives internal codes with which the apparatus can access font data at high speed. The character sequence drawing apparatus executes the font pattern obtaining function using the internal codes. This increases the possibility of speeding up the drawing of the character sequence.

In the above character sequence drawing apparatus, each piece of font access information may include an address of a piece of font data in the storage unit, each font pattern obtaining function identifies a font pattern based on a piece of font data that is identified by an input address of the piece of font data, and when the request receiving unit receives a request to draw a character sequence, the font processing function executing unit draws the character sequence by obtaining an address of a piece of font data from a piece of font access information corresponding to the obtained font ID based on the received request, and executing a font pattern obtaining function using the address of the piece of font data.

With the above construction, the font pattern obtaining function is not dedicated to a specific piece of font data, and can be used for accessing a plurality of pieces of font data. When the AP intends to use fonts A and B having font data with the same data structure, the AP previously sends a piece of font access information twice by changing only the font data address, and later requests the character sequence drawing apparatus to draw a character sequence with either font A or font B as necessary. With this sharing of the font pattern obtaining function, the storage unit is required to store a smaller amount of data than the case where a font pattern obtaining function is required for each piece of font data.

In the above character sequence drawing apparatus, the storage unit may store one or more initialization functions which are classified as a function type and each initialize a rasterizer that generates a font pattern based on a piece of font data, each piece of font access information includes address information which is either an address of an initialization function in the storage unit or null values, and when it is possible for the font processing function executing unit to obtain an address of an initialization function based on the received request from a piece of font access information corresponding to the obtained font ID, the font processing function executing unit executes an initialization function corresponding to the obtained address.

With the above construction, the AP sends a piece of font access information including an address of an initialization function to the character sequence drawing apparatus, so that the rasterizer is initialized with correspondence to the piece of font data.

In the above character sequence drawing apparatus, when the font access information obtaining unit obtains a piece of font access information, the font processing function executing unit may judge whether address information of initialization function in the obtained piece of font access information is the null values or not, when the address information is not the null values, the font processing function executing unit initializes the rasterizer by executing the initialization function.

With the above construction, when the AP intends to use a font that requires the rasterizer to use the font pattern, the AP previously sends a piece of font access information in which an address of an initialization function is set as the address information; and when the AP intends to use a font (e.g., a bitmap font) that does not require the rasterizer to use the font pattern, the AP previously sends a piece of font access information in which null values are set as the address information. This allows the rasterizer to be initialized as necessary. When the AP sends a piece of font access information in which an address of an initialization function is set as the address information to the character sequence drawing apparatus, the rasterizer being hardware is initialized. This eliminates the necessity of initialization of the rasterizer when the AP requests to draw a character sequence later. As a result, character sequences are drawn at high speed.

In the above character sequence drawing apparatus, the piece of font access information may include address information for each of the plurality of font processing functions, the address information being either an address of a corresponding font processing function in the storage unit or null values, and when address information of a font processing function included in a piece of font access information corresponding to the font ID obtained by the request receiving unit is not the null values, the font processing function executing unit executes the font processing function.

With the above construction, the AP can select font processing functions for each font by setting the address information of unnecessary font processing functions to null values. When, later, the AP sends a request to execute a process related to drawing of the character sequence, the character sequence drawing apparatus executes only necessary font processing functions for achieving the requested process.

The above character sequence drawing apparatus may further comprise: a reading unit operable to obtain font data and a font processing function from outside and store the obtained font data and the obtained font processing function in the storage unit; and an address managing unit operable to, upon receipt of a request from an application program, send an address of the font data or the font processing function to the application program.

With the above construction, even when font data and font processing functions are obtained from outside instead of being stored previously, the AP can obtain addresses of the font data and font processing functions and send a piece of font access information including one of the obtained addresses to the character sequence drawing apparatus, the address specifying a font processing function necessary for using a desired font.

The above object is also fulfilled by a character sequence drawing method which uses a plurality of pieces of font data and a plurality of font processing functions for using the plurality of pieces of font data, the character sequence drawing method comprising: a font access information obtaining step for obtaining a piece of font access information which includes a group of addresses of font processing functions, from an application program; a request receiving step for receiving from the application program a request which is related to drawing of a character sequence; and a font processing function executing step for identifying one or more addresses of font processing which have been predetermined with correspondence to the received request among the group of addresses of font processing functions included in the piece of font access information, and responding to the received request by executing one or more font processing functions corresponding to the one or more addresses. With the above construction, when the AP specifies a piece of font access information that includes a plurality of addresses of a plurality of font processing functions including a font pattern obtaining function, the character sequence drawing apparatus executes various processes (e.g., obtaining width of the character sequence) concerning the drawing of the character sequence in response to requests from the AP, using font processing functions whose locations are identified by the addresses.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 3 shows input parameters and output parameters of the API functions which are provided to APs from the character sequence drawing system 100;

FIG. 4 shows contents of a text context;

FIG. 5 shows input parameters and output parameters of the font library functions called by the character sequence drawing system 100;

DESCRIPTION OF THE PREFERRED EMBODIMENTS

Figure 1:
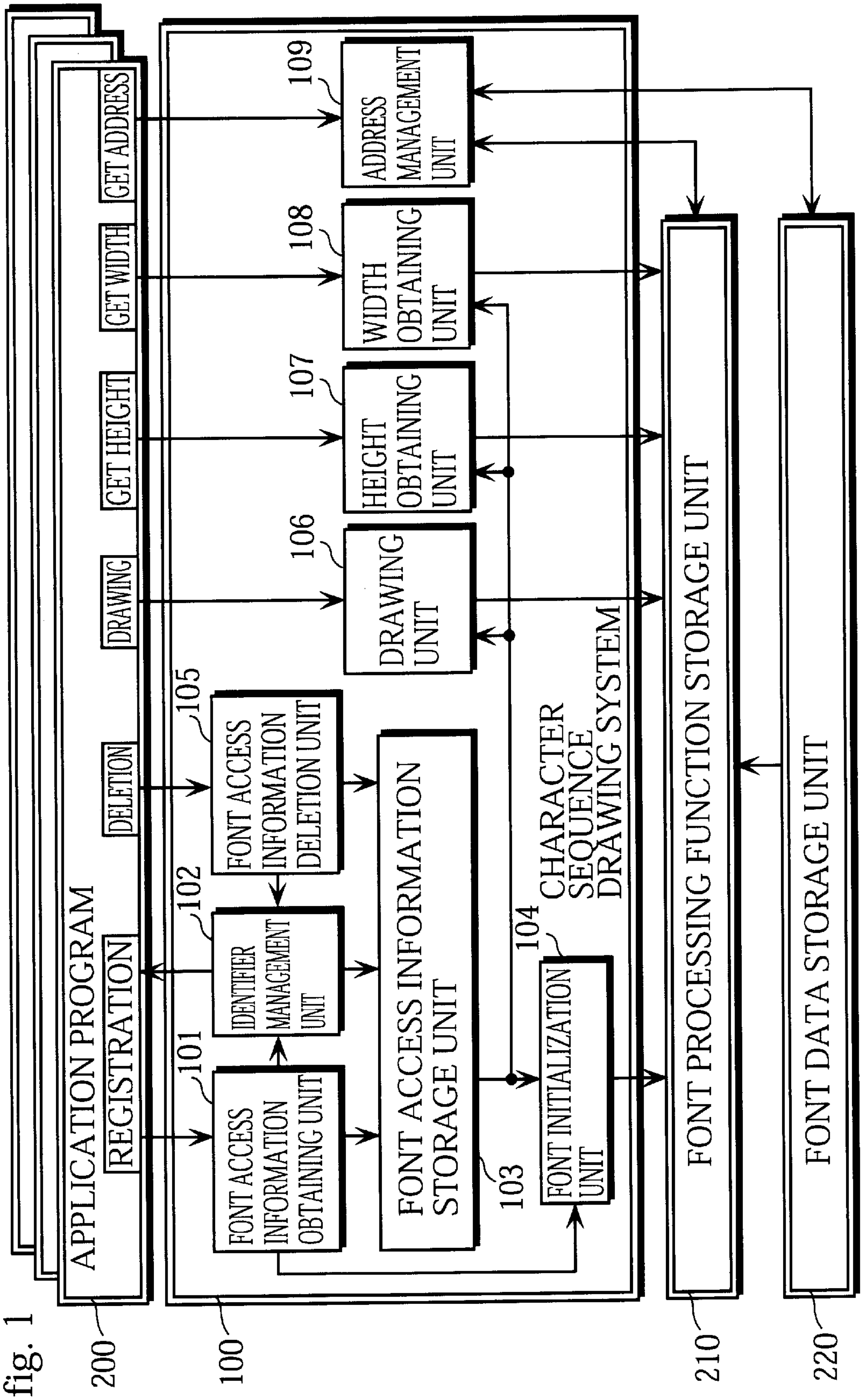
FIG. 1 shows a functional construction of the character sequence drawing system in the embodiment of the present invention.

The following are description of the present invention through a specific embodiment thereof (a character sequence drawing system) by way of referring to the drawings.

<Construction>

FIG. 1 shows a functional construction of the character sequence drawing system in the present embodiment.

FIG. 1 shows, in addition to a character sequence drawing system 100, a group of APs, a font processing function storage unit 210, and a font data storage unit 220 which are closely related to the character sequence drawing system 100.

As hardware, the group of APs and the character sequence drawing system 100 are achieved as a CPU and a memory included in a digital TV, for example. The font processing function storage unit 210 and the font data storage unit 220 are achieved as areas in the memory.

The character sequence drawing system 100 constitutes an OS and operates in relation to the character sequence drawing in response to requests from the plurality of APs including an AP 200 by executing various functions (hereinafter called font library functions) for performing processes to use the fonts stored in the font processing function storage unit 210.

The font library functions are divided into an initialization function, a character code conversion function, a common font metrics information obtaining function, a character-by-character font metrics information obtaining function, and a font pattern obtaining function.

The character sequence drawing system 100 executes a font registration process, a font deletion process, a drawing process, a height obtaining process, a width obtaining process, or an address obtaining process in response to requests from APs. Each AP issues a request for an operation to the character sequence drawing system 100 by calling an API function in accordance with a predetermined AP Interface (API). Detailed contents of the above processes will be described later.

In terms of the function, the character sequence drawing system 100 includes a font access information obtaining unit 101, an identifier management unit 102, a font access information storage unit 103, a font initialization unit 104, a font access information deletion unit 105, a drawing unit 106, a height obtaining unit 107, a width obtaining unit 108, and an address management unit 109, as shown in FIG. 1.

The font access information obtaining unit 101, upon receipt of a font registration request from an AP, obtains font access information from the AP, the font access information including font data and a set of addresses of font library functions. The font access information obtaining unit 101 then stores it in the font access information storage unit 103, requests the identifier management unit 102 to assign a font ID, judges, based on the font access information, whether execution of the initial function is necessary, and when having judged that it is necessary, notifies the font initialization unit 104 of the judgement.

The font access information deletion unit 105, upon receipt of a font deletion request from an AP with specification of a font ID, deletes font access information corresponding to the specified font ID from the font access information storage unit 103, and notifies the identifier management unit 102 of an unassignment of the font ID.

The identifier management unit 102, upon receipt of a font ID assignment request from the font access information obtaining unit 101, assigns a numeral value as a font ID, stores the assigned font ID with correspondence to the font access information stored in the font access information storage unit 103 by the font access information obtaining unit 101, and sends the font ID to the AP. The identifier management unit 102, upon receipt of notification of unassignment of a font ID from the font access information deletion unit 105, stores the font ID as an assignable font ID. It should be noted here that each font ID is a 2-byte numeral value, and basically the identifier management unit 102 assigns a numeral value as a font ID in an ascending order (e.g., 1, 2, 3, . . . ) every time it receives a font ID assignment request. After the maximum 2-byte value is used for the assignment, the identifier management unit 102 assigns, in an ascending order, a numeral value which has been assigned once as a font ID, and unassigned to be an assignable font ID. As described above, the identifier management unit 102 assigns to each AP a font ID that is used to identify the font access information obtained from the AP.

The font initialization unit 104, upon receipt of a notification from the font access information obtaining unit 101, refers to the font access information to obtain an address of an initialization function among font library functions, and execute the initialization function.

The drawing unit 106, upon receipt of a request to execute a drawing process from an AP, refers to the font access information to obtain an address of a font library function, and executes the font library function to draw a character sequence on a canvas, where the canvas is a rectangular area which is a mapped, logical two-dimensional coordinate space. The upper left corner of the canvas is the origin. As is the case with conventional techniques, the character sequence drawn on the canvas is then processed by an OS and a device driver, and displayed on a digital TV screen, for example.

The height obtaining unit 107, upon receipt of a request to obtain a height from an AP, refers to the font access information to obtain an address of a font library function, and executes the font library function to obtain an "ascent" and a "descent" of a character, determines a height based on the ascent and descent, and sends the height to the AP. The width obtaining unit 108, upon receipt of a request to obtain a width from an AP, refers to the font access information to obtain an address of a font library function, and executes the font library function to calculate the width of a character, and sends the width to the AP.

The address management unit 109 stores addresses of the font library functions stored in the font processing function storage unit 210 and stores addresses of the font data stored in the font data storage unit 220, with correspondence to the function names and font names. The address management unit 109, upon receipt of an address obtainment request specifying a function name or a font name from an AP, sends the requested address to the AP. The character sequence drawing system 100 can also download a font library function or font data from an external network or read them from a record medium, and store them in the font processing function storage unit 210 or the font data storage unit 220. When either of the above addresses is stored, the address management unit 109 stores the address of the font library function or the address of the font data with correspondence to the function name or the font name. Note that the function name and font name are file names.

Figure 2:
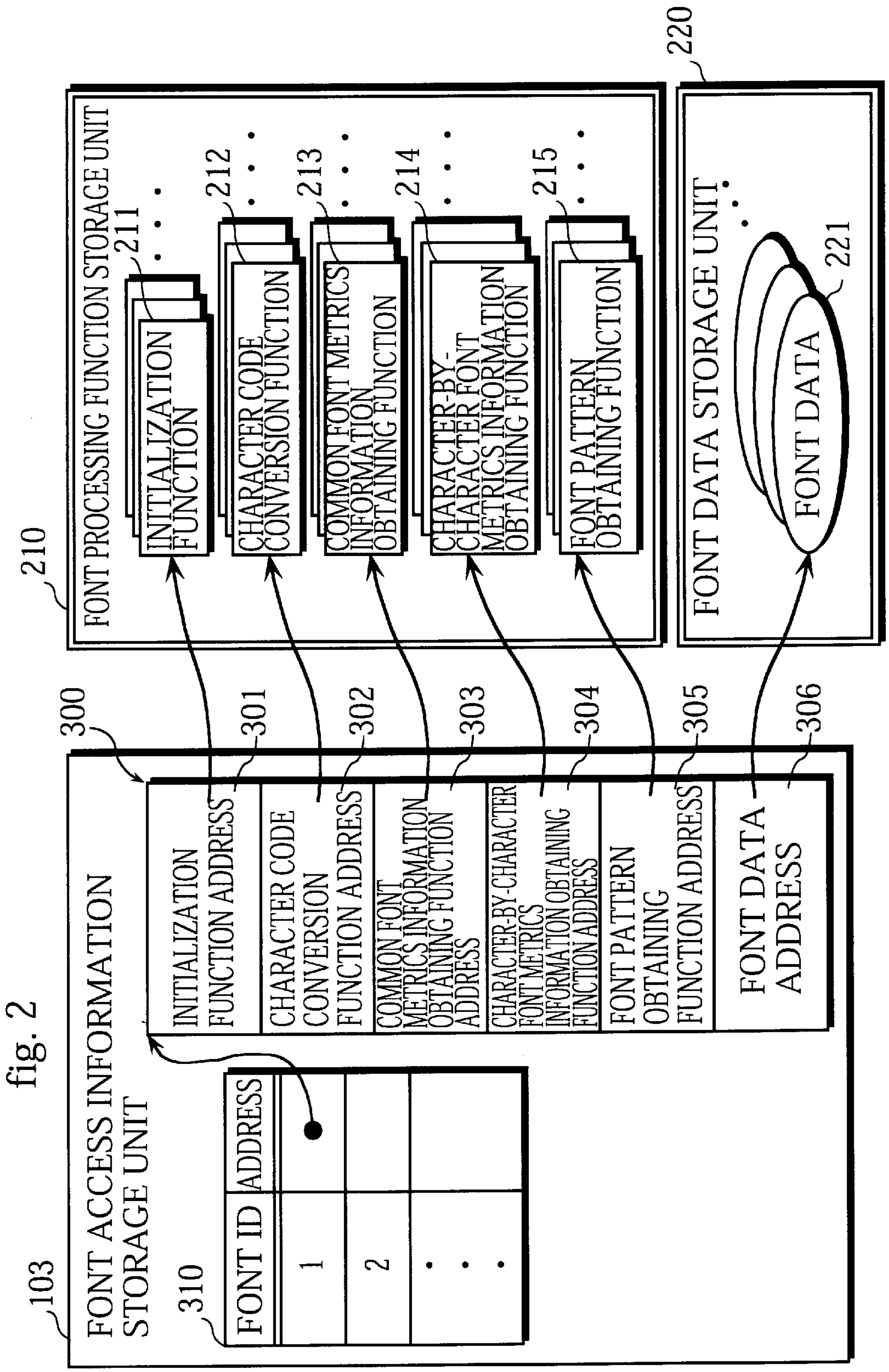
FIG. 2 shows contents of the font access information storage unit 103, font processing function storage unit 210, and font data storage unit 220.

FIG. 2 shows examples of contents of the font access information storage unit 103, font processing function storage unit 210, and font data storage unit 220.

As shown in FIG. 2, the font access information storage unit 103 stores font access information with correspondence to font IDs. The font access information shown in FIG. 2 was originally transferred from an AP to the font access information obtaining unit 101 when the AP requested to register a font, and has been stored in the font access information storage unit 103 by the font access information obtaining unit 101.

Font access information 300 is composed of an initialization function address 301, a character code conversion function address 302, a common font metrics information obtaining function address 303, a character-by-character font metrics information obtaining function address 304, a font pattern obtaining function address 305, and a font data address 306. In the example shown in FIG. 2, the font access information 300 corresponds to font ID "1".

As shown in FIG. 2, a plurality of pieces of font data can be stored in the font data storage unit 220, and each piece of font data includes a group of pieces of information used for identifying a group of glyphs and includes information related to attributes of the glyphs. Each of the font library functions such as the initialization function and the font pattern obtaining function corresponds to a piece of font data. However, a group of pieces of font data having a common data structure may correspond to one initialization function or one font pattern obtaining function. That is to say, two or more pieces of font data may share one font library function if they have the same data structure.

<AP Interface>

The following is a description of the API function of the character sequence drawing system 100 which is called by the APs.

FIG. 3 shows input parameters and output parameters of the API functions which are provided to APs from the character sequence drawing system 100.

Each parameter is transferred between the character sequence drawing system 100 and the APs in a predetermined format such as an argument or a return value having a predetermined size.

The "RegisterFont" function 401 is called by an AP when the AP issues a font registration request. The input parameter is font access information having the construction shown in FIG. 2, and the output parameter is a font ID. Therefore, when issuing the font registration request, the AP is required to specify addresses of a font library function and font data that can be used via the character sequence drawing system 100. When addresses of a font library function and font data to be used by APs are set beforehand, APs should specify the predetermined addresses. However, when using downloaded font data or the like, APs must obtain the address of the downloaded information first by using the "GetFontAddr" function 406 to specify the address. The APs should execute the font registration process before issuing a drawing request, a height obtaining request, or a width obtaining request.

The "DeleteFont" function 402 is called by an AP when the AP issues a font deletion request. The input parameter is a font ID and there is no output parameter for the "Delete-Font" function 402.

The "DrawText" function 403 is called by an AP when the AP issues a drawing request. The input parameters are a drawing-object canvas ID, a text context ID, drawing start coordinates (x,y), a character sequence, and a character sequence length, and there is no output parameter. The "DrawText" function 403 draws a row of characters.

The drawing-object canvas ID is an identifier used for identifying a canvas among a plurality of canvases that is currently an object of character sequence drawing. The drawing start coordinates are two-dimensional coordinates on the canvas indicating the upper left point of a rectangle in which the character sequence is to be drawn. The character sequence is represented by a character code sequence of a predetermined code system such as ASCII. The character sequence length is represented by the length of the character code sequence which is represented by bytes, for example. The text context ID is an identifier used for identifying a text context which is a group of detailed parameters required to draw the text. APs execute an API function (not illustrated) for generating a text context to obtain the text context ID. The text context will be described later.

The "GetTextHeight" function 404 is called by an AP when the AP issues a height obtaining request. The input parameter is a text context ID and the output parameter is a height of a font.

The "GetTextWidth" function 405 is called by an AP when the AP issues a width obtaining request. The input parameters are a text context ID, a character sequence, and a character sequence length, and the output parameter is the width of the character sequence.

The "GetFontAddr" function 406 is called by an AP when the AP issues a request to obtain an address of a font library function or font data. The input parameter is a font library function name or a font data name, and the output parameter is an address of a font library function or font data.

FIG. 4 shows contents of a text context.

In FIG. 4, "TEXT COLOR" indicates a color used for drawing a character sequence. The "UNDERLINE FLAG" indicates whether an underline should be drawn on the character sequence. The "FRAME FLAG" indicates whether a rectangular frame should be drawn around the character sequence. The "OUTLINE FLAG" indicates whether the character sequence should be outlined. The "BACKGROUND FLAG" indicates whether a fixed background should be added to the character sequence or the background should not be drawn. The "BOLDFACE/LIGHTFACE FLAG" indicates whether the character sequence should be boldface or lightface. The "FONT SIZE" indicates a character size represented in units of, for example, points. The "FONT ID" indicates a font ID that is assigned by the identifier management unit 102 when an AP issues a font registration request as described above.

<Font Library Function Interface>

The following is a description of the font library function interface.

FIG. 5 shows input parameters and output parameters of the font library functions called by the character sequence drawing system 100.

FIG. 5 shows input parameters and output parameters for each of the font library functions. In reality, however, each parameter is transferred between the character sequence drawing system 100 and the font library functions in a predetermined format such as an argument or a return value having a predetermined size.

It is basically presumed that each type of font library function is created by the creator of the font data. The font library functions should be created to satisfy predetermined interfaces such as those shown in FIG. 5.

The initialization function 501 does not have an input parameter. The initialization function is defined as being called once before the font is used, and performs a process for initializing the rasterizer which is used for expanding the font pattern of an outline font or the like. The creator of the font library functions need not create the initialization function in terms of the fonts that do not require a rasterizer.

The input parameter of the character code conversion function 502 is a character sequence and a character sequence length, and the output parameter is an internal code sequence and an internal code sequence length. The character sequence is represented by a character code sequence, and the character sequence length is represented by the length of the character code sequence which is represented by bytes. The internal code sequence is converted from a character code sequence into a format facilitated to access the font data, and is a sequence of internal codes which are two-byte identification codes used for identifying glyphs. The internal code sequence length is the length of the internal code sequence which is represented by bytes. The creator of the font library functions may determine the internal codes as (1) font metrics information that indicates the characteristic of the glyphs corresponding to the input character codes and (2) addresses in font data that indicate locations of font patterns, for example. The creator of the font library functions needs to create a character-by-character font metrics information obtaining function 504 and a font pattern obtaining function 505 as functions that obtain font metrics information and a font pattern that are characteristics of the glyph identified by the internal code.

The input parameters of a common font metrics information obtaining function 503 are a font data address and a font size, and the output parameters are "ascent", "descent", and an average width that are characteristics of the whole font. The font data address is a memory address of a piece of font data in the font data storage unit 220, the piece of font data being an object to be obtained for the common font metrics information. The font size is a size used for drawing the font and is represented in units of, for example, points. The average width is an average width of the whole glyph, and indicates the width of every glyph in the case of a font having a fixed pitch. In the case of a proportional font, the width of the whole glyph is not constant, and therefore the character-by-character font metrics information obtaining function 504 is useful.

The input parameters of the character-by-character font metrics information obtaining function 504 are a font data address, a font size, and an internal code, and the output parameter is a character width. Here, the character width is the width of the glyph that is identified by the internal code. Also, the width of the glyph is the maximum width of a certain glyph, and does not include the length of spaces around the glyph. In the case of a font having a fixed pitch, there is no need of creating the character-by-character font metrics information obtaining function.

The input parameters of a font pattern obtaining function 505 are a font data address, a font size, and an internal code, and the output parameters are a font pattern address, a font pattern width, and a font pattern height. The font pattern obtaining function extracts the font pattern of a glyph, stores the font pattern in a memory, and then outputs the memory address of the font pattern as the font pattern address. The font pattern obtaining function holds the font pattern stored in the memory until the font pattern is called again. A font pattern obtaining function corresponding to an outline font may generate a font pattern at high speed using a rasterizer which is hardware.

The font pattern width in the output parameter for the font pattern obtaining function 505 is represented by the number of pixels constituting a horizontal side of-a font pattern which is a rectangular dot pattern framing the glyph and is used for drawing, and the font pattern height is represented by the number of pixels constituting a vertical side of the font pattern. It should be noted here that the font pattern conforms to a predetermined data format such as the bitmap format.

<Font Data>

The following is a description of the data structure of the font data using font data A to C as examples.

Figure 6:
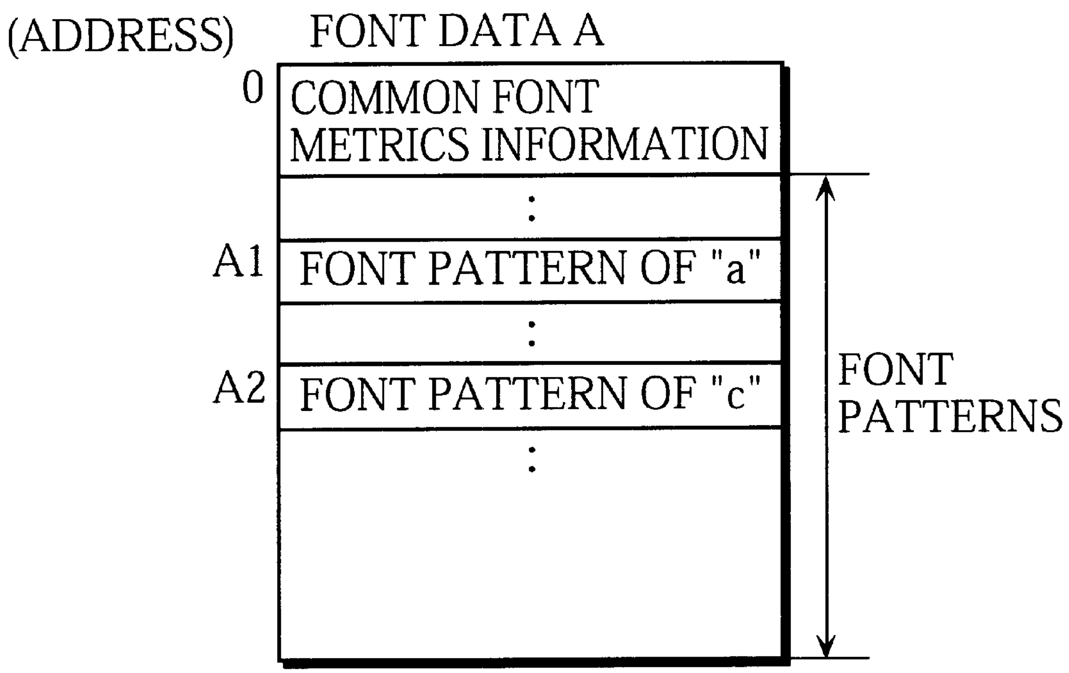
FIG. 6 shows the data structure of the font data A stored in the font data storage unit 220.
Figure 7:
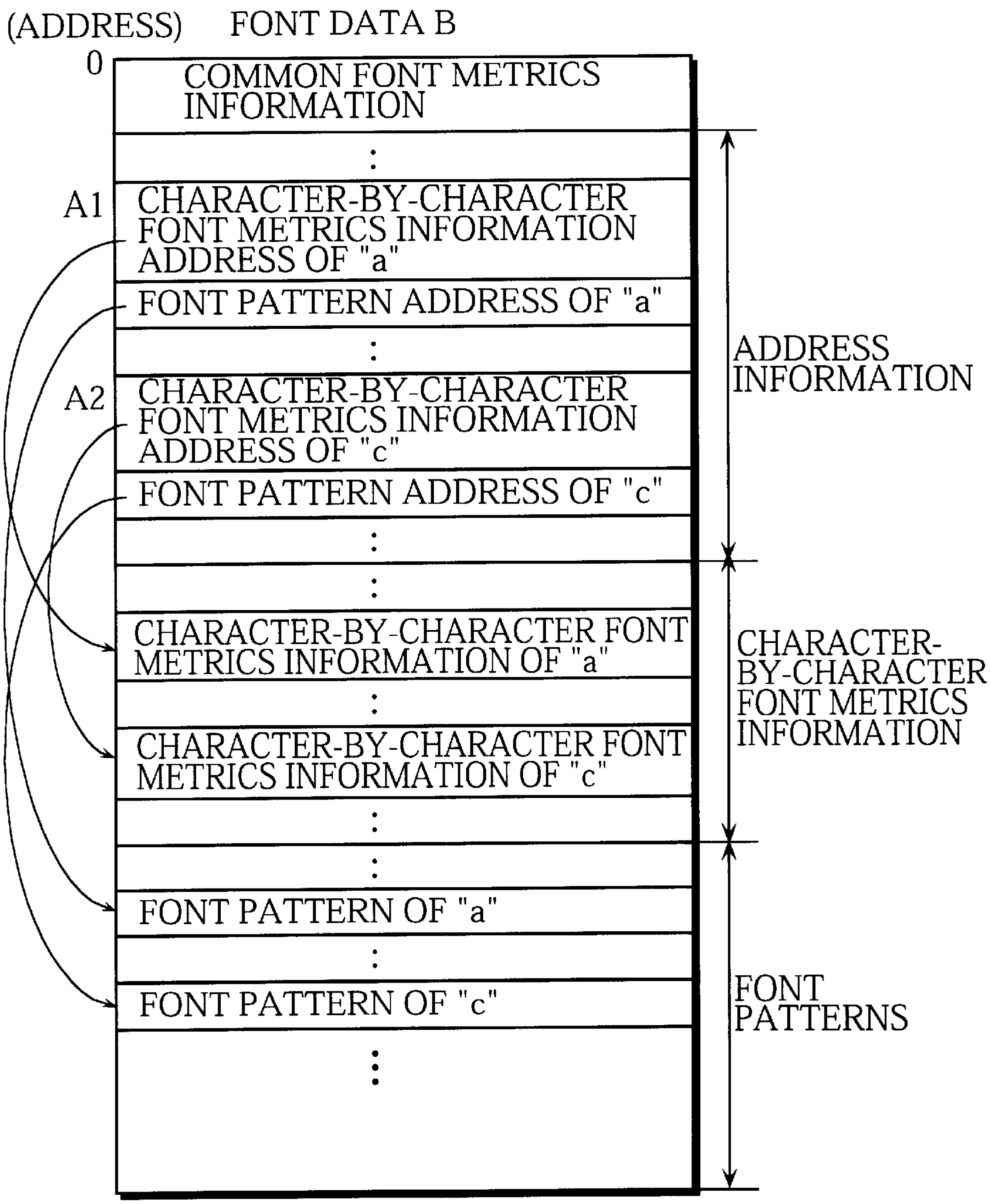
FIG. 7 shows the data structure of the font data B stored in the font data storage unit 220.
Figure 8:
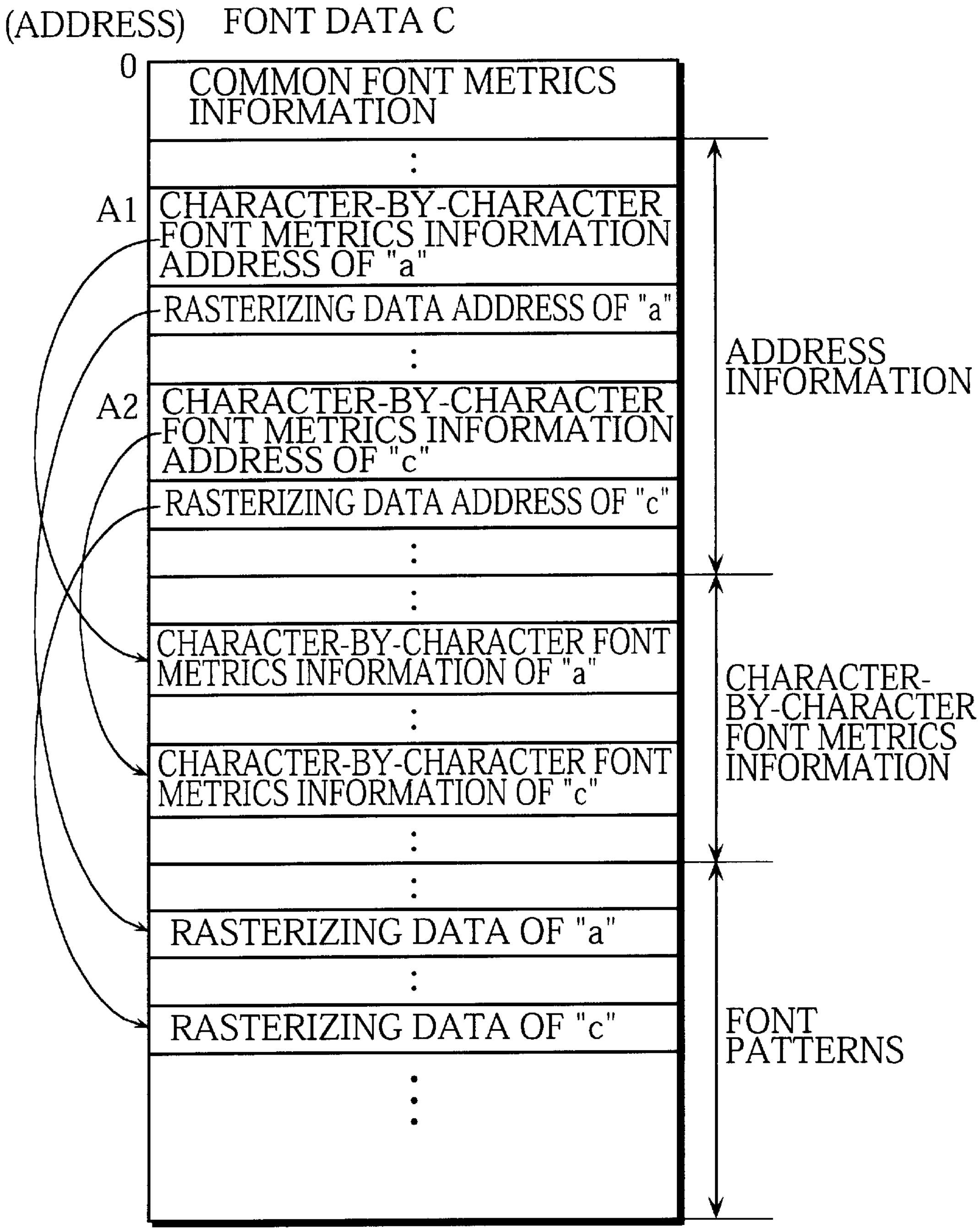
FIG. 8 shows the data structure of the font data C stored in the font data storage unit 220.

FIGS. 6 to 8 show the data structure of the font data A to C stored in the font data storage unit 220.

Font data A is a bitmap font having a certain fixed pitch, and is composed of common font metrics information and font patterns of glyphs.

Font data B is a bitmap font being a certain proportional font, and is composed of (1) common font metrics information, (2) address information which is a set of addresses of font metrics information of glyphs and font pattern addresses, (3) character-by-character font metrics information which is a set of pieces of font metrics information of glyphs, and (4) font patterns of glyphs.

Font data C is an outline font being a certain proportional font, and is composed of (1) common font metrics information, (2) address information, (3) character-by-character font metrics information, and (4) rasterizing data which is a set of pieces of rasterizing information such as (a) coordinate data of lines constituting characters of glyphs and (b) programs.

The output parameter, namely the internal code, of the character code conversion function may be, for example, addresses A1 and A2 shown in FIGS. 6 to 8 with correspondence to characters "a" and "c". Provided that the character-by-character font metrics information obtaining function and the font pattern obtaining function obtain the character-by-character font metrics information or font patterns using the internal codes as the keys, the character code conversion function is useful in that it converts a character code into an internal code that is useful for increasing the speed of accessing information on each glyph in accordance with the data structure of the font data.

The font data storage unit 220 stores other font data, as well as the font data A to C having the above-described structure. Note that the creator or the like of the font data creates the font library functions in accordance with the data structure of the font data and provides the created font library functions. The font processing function storage unit 210 stores the provided font library functions.

<Operation>

Now, the operation of the character sequence drawing system 100 will be described in terms of the processes executed in response to requests issued from the AP using the above-described API functions, in the order of the font registration process, drawing process, height obtaining process, width obtaining process, and font deletion process. It is presumed that the AP has created a text context and has obtained a text context ID from the OS.

First, the font registration process will be described.

Figure 9:
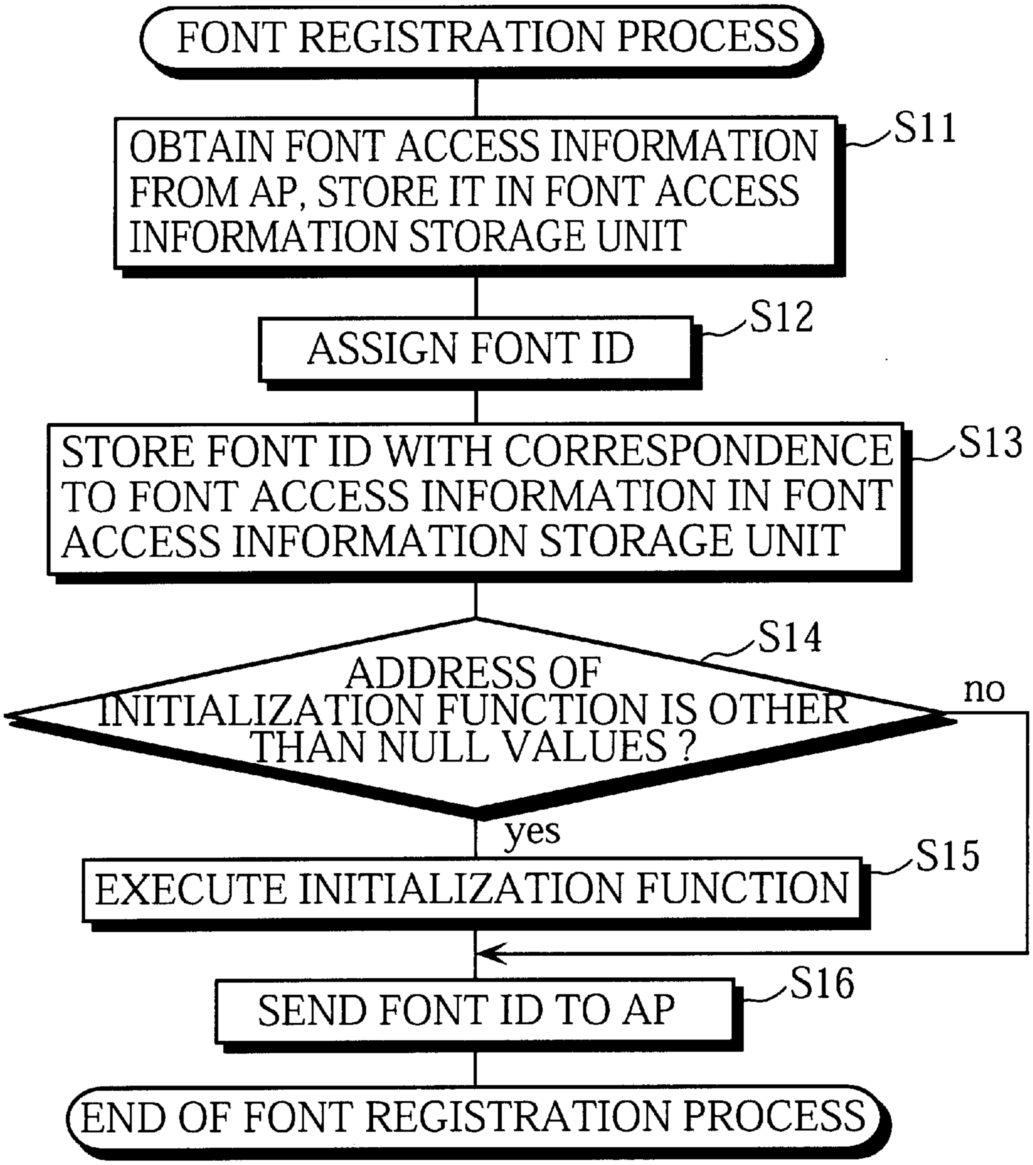
FIG. 9 is a flowchart showing the procedure of the font registration process.

FIG. 9 is a flowchart showing the procedure of the font registration process.

The AP needs to execute the RegisterFont function first when drawing a character sequence using a font.

As shown in FIG. 9, when the AP calls the RegisterFont function, the font access information obtaining unit 101 obtains from the AP the font access information which is an input parameter of the RegisterFont function, stores the font access information in the font access information storage unit 103 (step S11), and requests the identifier management unit 102 to assign a font ID.

The AP may have null values as the addresses of the initialization function and character-by-character font metrics information obtaining function which are included in the font access information being an input parameter of the RegisterFont function. That is to say, the AP may have null values as the address of the initialization function when the font used for the drawing is a kind of font, such as a bitmap font, that does not use the rasterizer and when the initialization function need not be executed. Also, the AP may have null values as the address of the character-by-character font metrics information obtaining function when the font used for the drawing is a font having a fixed pitch.

Upon receipt of a request to assign a font ID, the identifier management unit 102 determines a font ID which is not used currently (step S12).

The identifier management unit 102 then stores the determined font ID by bringing it into correspondence with the font access information stored in the font access information storage unit 103 in step S11 (step S13).

The font access information obtaining unit 101 then judges whether the address of the initialization function included in the obtained font access information is other than null values (step S14), and when the address of the initialization function is other than null values, the font initialization unit 104 executes the initialization function indicated by the address of the initialization function (step S15). When the address of the initialization function is null values, the step S15 is skipped.

As understood from the above description, the font registration request from the AP can also be used as a request to execute the initialization function, namely, a request to initialize the rasterizer when the initialization function address is not null values.

After the step S15, the identifier management unit 102 sends the font ID to the AP (step S16). With this step, the font registration process is completed.

Secondly, the drawing process will be described.

Figure 10:
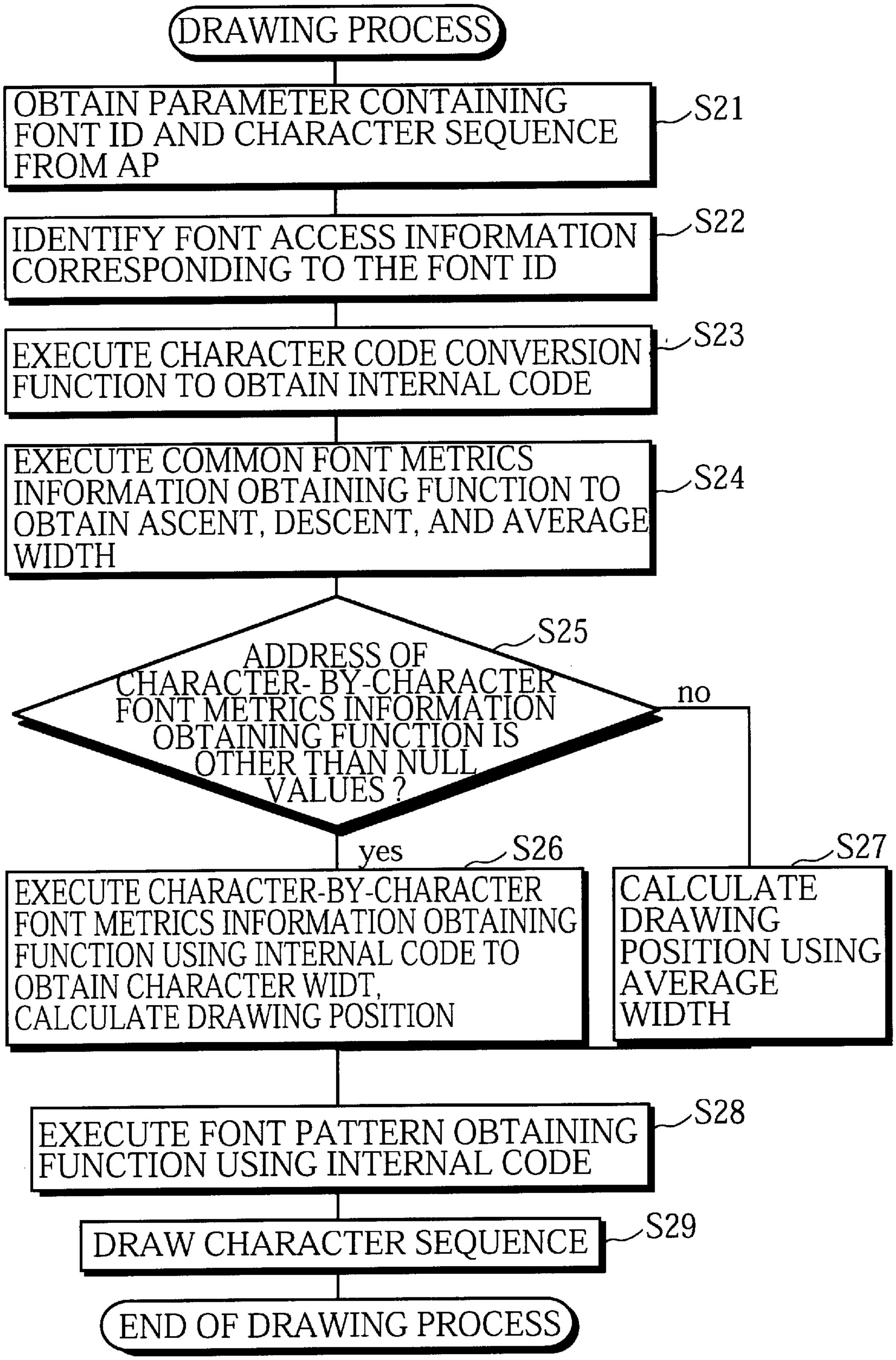
FIG. 10 is a flowchart showing the procedure of the drawing process.

FIG. 10 is a flowchart showing the procedure of the drawing process.

When the AP calls the DrawText function, the drawing unit 106 obtains input parameters of the DrawText function (step S21). This allows a character sequence or the like to be obtained. The drawing unit 106 then identifies a piece of font access information stored in the font access information storage unit 103, the piece of font access information corresponding to a font ID contained in a text context identified by a text context ID that is included in the input parameter (step S22).

The drawing unit 106 executes a character code conversion function indicated by a character code conversion function address in the identified piece of font access information, using the character sequence obtained in step S21, and obtains an internal code sequence as a result of the execution (step S23).

The drawing unit 106 then executes a common font metrics information obtaining function indicated by a common font metrics information obtaining function address in the identified piece of font access information, using the font data address in the identified piece of font access information and using the font size in the text context, and obtains an ascent, a descent, and an average width as a result of the execution (step S24).

The drawing unit 106 then judges whether the character-by-character font metrics information obtaining function address in the identified piece of font access information is other than null values (step S25).

When the drawing unit 106 judges that the address is other than null values in step S25, the drawing unit 106 calculates a drawing position of each character in the character sequence by executing a character-by-character font metrics information obtaining function indicated by the corresponding address, using (1) a font size in the text context that can be identified by a text context ID which is an input parameter of the DrawText function, (2) a font data address in the identified piece of font access information, and (3) the internal codes obtained in step S23. That is to say, the drawing unit 106 calculates a drawing position of each character in the character sequence by executing a character-by-character font metrics information obtaining function for each 2-byte internal code in the internal code sequence to obtain a width of each character (step S26).

When the drawing unit 106 judges that the address is null values in step S25, the drawing unit 106 calculates a drawing position of each character in the character sequence using the average width obtained in step S24 (step S27). After step S26 or step S27, the drawing unit 106 obtains a font pattern by executing a font pattern obtaining function indicated by the corresponding address in the identified piece of font access information, using, as is the case with step S16, a font size, a font data address, and the internal codes (step S28). That is to say, the drawing unit 106 obtains a font pattern of each character in the character sequence by executing a font pattern obtaining function for each 2-byte internal code in the internal code sequence.

The drawing unit 106, having obtained a font pattern in step S28, draws a group of font patterns that corresponds to a row of characters in area whose upper left corner is a point indicated by the drawing start coordinates in the canvas identified by the drawing-object canvas ID which is an input parameter of the DrawText function (step S29). With this step, the drawing process is completed. Note that the group of font patterns drawn in the above steps have been decorated in accordance with the attributes specified in the text context, such as the text color and the underline flag. That is to say, in step S29, the character sequence sent from the AP is drawn using the font and attributes specified by the AP. Note that the ascent and descent obtained in step S24 are added up and used for obtaining a height of a rectangular area that can be used as the background of the group of font patterns.

Thirdly, the height obtaining process will be described.

Figure 11:
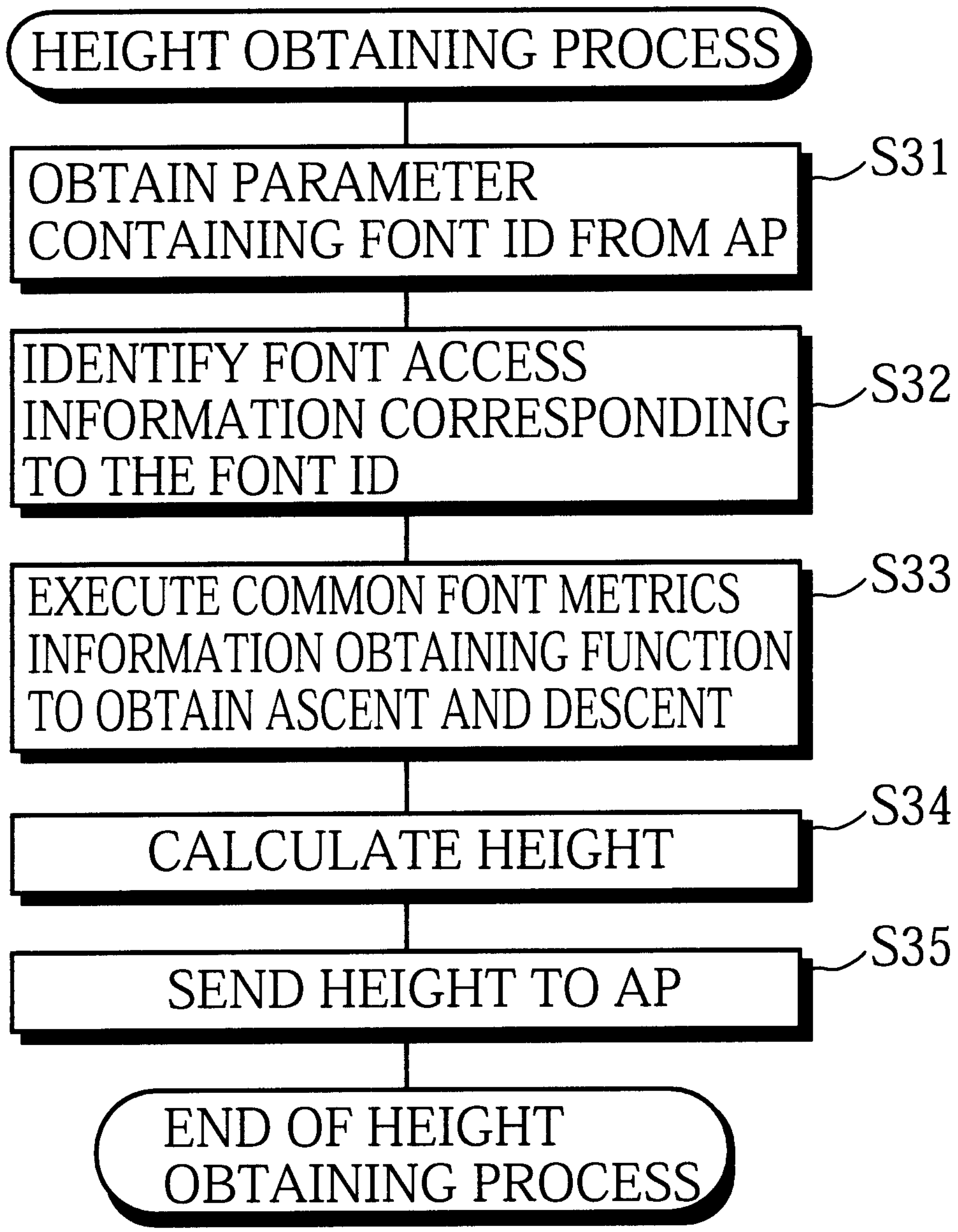
FIG. 11 is a flowchart showing the procedure of the height obtaining process.

FIG. 11 is a flowchart showing the procedure of the height obtaining process.

When drawing a character sequence, the AP requires information concerning height of the character sequence to adjust distance between lines or the like. For this purpose, the AP calls the GetTextHeight function to obtain the height of the character sequence.

After the GetTextHeight function is called by the AP, the height obtaining unit 107 obtains input parameters of the function (step S31). With this operation, the text context ID is obtained. This allows a font ID included in a text context identified by the text context ID to be obtained. The height obtaining unit 107 then identifies a piece of font access information corresponding to the font ID, the information being stored in the font access information storage unit 103 (step S32).

The height obtaining unit 107 executes a common font metrics information obtaining function in a location indicated by a common font metrics information obtaining function address in the identified piece of font access information using a font data address in the piece of font access information and a font size in the text context, and obtains an ascent and a descent as a result of the execution (step S33).

The height obtaining unit 107 adds up the ascent and the descent and calculates the height of the font, namely the height of the character sequence to be drawn using the added up ascent and descent (step S34), and sends the height to the AP (step S35). With this step, the height obtaining process is completed.

Fourthly, the width obtaining process will be described.

Figure 12:
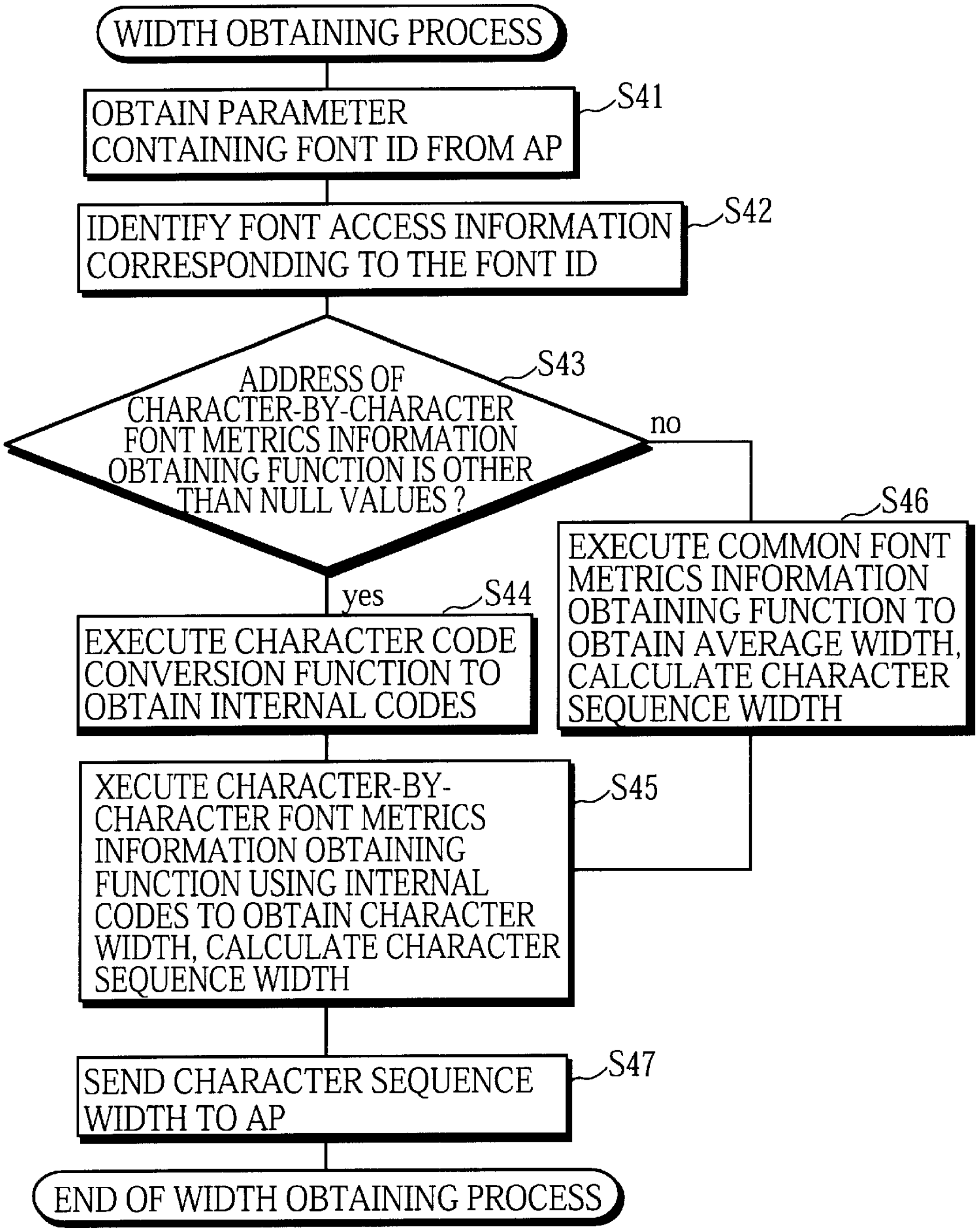
FIG. 12 is a flowchart showing the procedure of the width obtaining process.

FIG. 12 is a flowchart showing the procedure of the width obtaining process.

When drawing a character sequence, the AP requires information concerning width of the character sequence to obtain a drawing area on the canvas or the like. For this purpose, the AP calls the GetTextWidth function to obtain the width of the character sequence.

After the GetTextWidth function is called by the AP, the width obtaining unit 108 obtains input parameters of the function (step S41). With this operation, the character sequence and the like are obtained. This also allows a font ID included in a text context identified by the text context ID to be obtained. The width obtaining unit 108 then identifies a piece of font access information corresponding to the font ID, the information being stored in the font access information storage unit 103 (step S42).

The width obtaining unit 108 judges whether a character-by-character font metrics information obtaining function address in the identified piece of font access information is other than null values (step S43). After judging positively, the width obtaining unit 108 executes a character code conversion function in a location indicated by a character code conversion function address in the identified piece of font access information using the character sequence obtained in step S41, and obtains an internal code sequence as a result of the execution (step S44).

The width obtaining unit 108 then executes a character-by-character font metrics information obtaining function in a location indicated by a character-by-character font metrics information obtaining function address in the identified piece of font access information using a font data address in the piece of font access information, a font size in the text context, and the internal code sequence, and obtains character widths as a result of the execution. The width obtaining unit 108 then calculates the character sequence width using the character widths (step S45). That is to say, the width obtaining unit 108 obtains a character width of each character by executing the character-by-character font metrics information obtaining function for each 2-byte internal code in the internal code sequence. The width obtaining unit 108 obtains the width of the whole character sequence by adding up the width of each character.

After judging negatively in step S43, the width obtaining unit 108 executes executes a common font metrics information obtaining function in a location indicated by a common font metrics information obtaining function address in the identified piece of font access information using a font data address in the piece of font access information and a font size in the text context, and obtains an average width as a result of the execution. The width obtaining unit 108 obtains the width of the whole character sequence by multiplying the average width by the number of characters (step S46).

After step S45 or S46, the width obtaining unit 108 sends the obtained character sequence width to the AP (step S47). With this step, the width obtaining process is completed.

Lastly, the font deletion process will be described.

Figure 13:
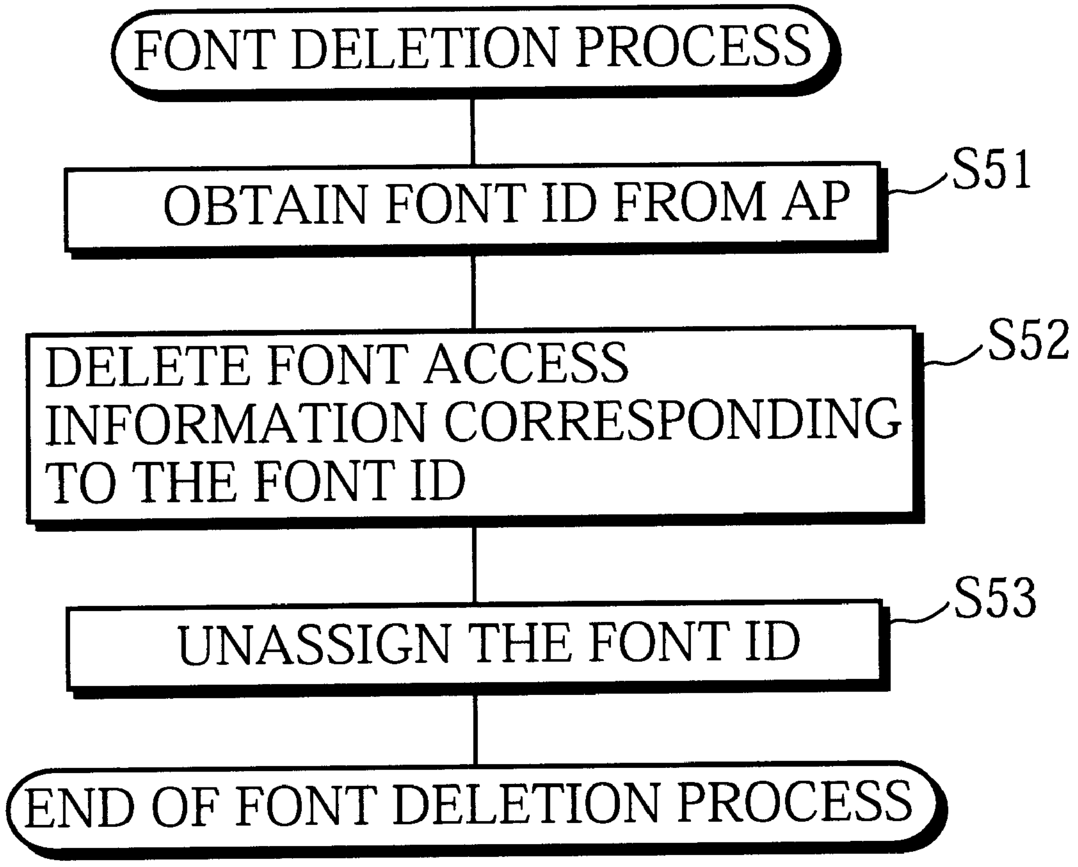
FIG. 13 is a flowchart showing the procedure of the font deletion process.

FIG. 13 is a flowchart showing the procedure of the font deletion process.

The AP needs to execute the DeleteFont function when a font becomes unnecessary after drawing a character sequence using the font.

After the DeleteFont function is called by the AP, the font access information deletion unit 105 obtains a font ID that is an input parameter of the function (step S51).

The font access information deletion unit 105 deletes a piece of font access information in the font access information storage unit 103 corresponding to the obtained font ID (step S52), notifies the identifier management unit 102 of unassignment of the font ID (step S53). With this step, the font deletion process is completed. Note that the font access information deletion unit 105 also deletes the font ID corresponding to the deleted piece of font access information from the font access information storage unit 103. Also, upon receipt of the notification of unassignment of the font ID, the identifier management unit 102 unassigns the font ID. That is to say, the identifier management unit 102 stores a numeral value having been assigned as the font ID as a numeral value assignable as another font ID.

APs can instruct the character sequence drawing system to draw character sequences with specified fonts by executing the above-described processes. When an AP intends to draw a plurality of character sequences using a plurality of different fonts, the AP prepares font access information that includes addresses of font data for all the fonts to be used, repeatedly requests the character sequence drawing system to execute the font registration process to obtain a plurality of font IDs, and requests to execute the drawing process for each different font using each obtained font ID. When using a font that has a different piece of font data for each font size (e.g., a bitmap font), the AP needs to request the character sequence drawing system to execute the font registration process after preparing a piece of font access information that includes addresses of pieces of font data corresponding to the font sizes intended to be used.

<Supplements>

Up to this point, the character sequence drawing apparatus of the present invention has been described with reference to the character sequence drawing system as an embodiment. It is needless to say however that the present invention is not limited to this embodiment. Many variations are applicable to the present invention as follows.

(1) In the present embodiment, the character sequence drawing system can deal with variable-length font data such as an outline font. However, the character sequence drawing system may use only fixed-length font data such as a general bitmap font. In this case, the font library function need not have a font size as an input parameter. Also, when sending an API function to the character sequence drawing system, the AP need not include in it information for identifying a font size as an input parameter. As a result, it is possible to arrange interfaces of functions so that the interfaces have only necessary information as their input parameters. Note that in this case, APs include addresses of font data necessary for the sizes to be used, such as 24-dot bitmap font data or 32-dot bitmap font data, in font access information, and request to execute the font registration process.

(2) Input or output parameters for the font library function or the API function shown in the present embodiment may be defined to include other information. For example, each function may have information indicating whether the process of the function has been done normally, as an output parameter. Also, the character-by-character font metrics information obtaining function may have information related to kerning, as an output parameter.

The character-by-character font metrics information obtaining function or the font pattern obtaining function may receive an internal code sequence instead of an internal code, and output a set of character widths or a set of font pattern addresses corresponding to the internal code sequence.

The features provided by the character sequence drawing system to the AP are not limited to those shown in the present embodiment. For example, the character sequence drawing system may have an API function that obtains various attributes of a font based on information obtained by executing the common font metrics information obtaining function or the character-by-character font metrics information obtaining function, and conveys the obtained attributes to the AP.

The common font metrics information obtaining function and the character-by-character font metrics information obtaining function may be defined as one function (hereinafter, called a font metrics information obtaining function). The creator of the font data also creates the font metrics information obtaining function, and the character sequence drawing system executes the font metrics information obtaining function instead of the common font metrics information obtaining function or the character-by-character font metrics information obtaining function. In this case, the font metrics information obtaining function is stored in the font processing function storage unit 210. Also, the AP needs to include an address of the font metrics information obtaining function in the font access information when it requests to execute the font registration process.

It is possible to additionally prepare a font library function that can be obtained by the AP via the character sequence drawing system and has information, as an output parameter, indicating whether the initialization function or the character-by-character font metrics information obtaining function is included in a group of font library functions related to a certain piece of font data. In this case, the information may be font type information that indicates whether a font is a proportional font, an outline font or the like.

The names of the API functions shown in the present embodiment are one example, and any other names are possible.

(3) In the present embodiment, the character sequence drawing system uses the ASCII code when the AP specifies a drawing object character sequence. However, another predetermined code may be used instead. Alternatively, various codes may be used and the AP may specify a code. To use various codes, the function interface needs to be arranged so that the character code conversion function additionally has information indicating a code, as an input parameter, and so that the character code conversion function converts a character code sequence into an internal code sequence in accordance with the code specified in the input parameter.

In the character code conversion function created with correspondence to the Unicode, when a character sequence "abë" represented by character codes "0×0061", "0×0062", "0×0065", and "0×0308" is input, an output internal code sequence is composed of three internal codes. Here, since the character "ë" is represented by combining two character codes, the two character codes are converted into one internal code.

It should be noted here that though in the present embodiment, an internal code has 2 bytes, the size of the internal code is not limited to this.

(4) In the character sequence drawing system in the present embodiment, the font library function or font data is downloaded from an external network or read out from a record medium and stored in the font processing function storage unit 210 or the font data storage unit 220. However, the font processing function storage unit 210 or the font data storage unit 220 may be achieved by a ROM that prestores the font library function or font data, and the character sequence drawing system may not download or read data from a record medium. Also, in this case, the ROM may be replaceable.

(5) The data stored in the font access information storage unit 103 in the present embodiment (see FIG. 2) may have any data structure as far as addresses of font library functions, addresses of font data, and font IDs are corresponded to each other.

(6) The GetTextHeight function or the GetTextWidth function in the present embodiment may obtain the height or width of the character sequence by reflecting information shown in the text context, such as information indicating whether the characters should be drawn with boldface or lightface, and send the obtained height or width to the AP.

(7) Though in the present embodiment, data format of the font pattern obtained from a location indicated by the font pattern address which is an output parameter of the font pattern function is a bitmap format, the data structure is not limited to this, and any data format will do as far as the data structure is predetermined by the character sequence drawing system.

In the present embodiment, input parameters of the font pattern obtaining function and the character-by-character font metrics information obtaining function include internal codes. However, the input parameters may include character codes instead of internal codes. When the function interfaces are defined as above, the character code conversion function is not necessary and the address of the character code conversion function should be removed from the font access information.

(8) The font library functions in the present embodiment may include functions which each process only one data font, such as a font data obtaining function "get_font_data_A" dedicated to font data A, a font data obtaining function "get_font_data_B" dedicated to font data B, and a common font metrics information obtaining function "get_font_info_A" dedicated to font data A. In this case, neither input parameters of the font library function nor font access information includes font data addresses.

(9) A computer program that allows a household electrical appliance being able to execute a program, a general-purpose computer or the like to execute the procedures of the character sequence drawing system in the present embodiment (e.g., the procedures shown in FIGS. 9 to 13) may be recorded in a record medium to be distributed, or may be distributed via various communication paths or the like. Such record mediums are, for example, IC cards, optical discs, flexible discs, and ROMs. The distributed computer programs are installed onto household electrical appliances, computers or the like. The household electrical appliances, computers or the like execute an installed computer program to achieve the character sequence drawing system in the present embodiment.

The present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A character sequence drawing apparatus comprising:

a storage unit operable to store a plurality of pieces of font data and a plurality of font processing functions for using the plurality of pieces of font data wherein the plurality of font processing functions are classified into a plurality of function types, and the storage unit stores one or more font processing functions for each of the plurality of function types;

a font access information obtaining unit operable to obtain a piece of font access information which includes a group of addresses of font processing functions, from an application program, and one address for each of the plurality of function types, wherein the font access information obtaining unit, for each obtainment of a piece of font access information, assigns a font ID to each obtained piece of font access information, holds the assigned font IDs and pieces of obtained font access information, and sends each font ID to the application program, wherein the font IDs correspond to the pieces of font access information on a one-to-one basis;

a request receiving unit operable to receive from the application program a request which is related to drawing of a character sequence, wherein the request receiving unit receives a font ID together with the request from the application program; and a font processing function executing unit operable to identify one or more addresses of font processing functions which have been predetermined with correspondence to the received request among a group of addresses of font processing functions included in a piece of font access information corresponding to the obtained font ID, and respond to the received request by executing one or more font processing functions corresponding to the one or more addresses.

2. The character sequence drawing apparatus of claim 1, wherein the storage unit stores one or more font pattern obtaining functions which are classified as a function type and each identify a font pattern based on a piece of font data and obtain the identified font pattern, each piece of font access information includes an address of a font pattern obtaining function in the storage unit, and when the request receiving unit receives a request to draw a character sequence, the font processing function executing unit draws the character sequence by identifying an address of a font pattern obtaining function based on the received request among a group of addresses of font processing functions included in a piece of font access information corresponding to the obtained font ID and executing the font pattern obtaining function corresponding to the identified address to obtain font patterns of characters included in the character sequence.

3. The character sequence drawing apparatus of claim 2, wherein each piece of font data contains common font metrics information that shows attributes common to a plurality of glyphs, two attributes among the attributes being an ascent and a descent, the storage unit stores one or more common font metrics information obtaining functions which are classified as a function type and each obtain common font metrics information by accessing a piece of font data, each piece of font access information includes an address of a common font metrics information obtaining function in the storage unit, and the font processing function executing unit identifies an address of a common font metrics information obtaining function based on the received request among a group of addresses of font processing functions included in a piece of font access information corresponding to the obtained font ID and executes the common font metrics information obtaining function.

4. The character sequence drawing apparatus of claim 3, wherein when the request receiving unit receives a request to obtain a height of a font, the font processing function executing unit obtains the ascent and the descent by executing the common font metrics information obtaining function, calculates the height of the font based on the ascent and the descent, and sends a result of the calculation to the application program.

5. The character sequence drawing apparatus of claim 3, wherein each piece of font data contains glyph-by-glyph font metrics information that shows attributes unique to the plurality of glyphs, wherein one of the attributes is a glyph width, the storage unit stores one or more glyph-by-glyph font metrics information obtaining functions which are classified as a function type and each obtain a glyph-by-glyph font metrics information by accessing a piece of font data, each piece of font access information includes address information which is either an address of a glyph-by-glyph font metrics information obtaining function in the storage unit or null values, and when it is possible for the font processing function executing unit to obtain an address of a glyph-by-glyph font metrics information obtaining function based on the received request among a group of addresses of font processing functions included in a piece of font access information corresponding to the obtained font ID, the font processing function executing unit executes the glyph-by-glyph font metrics information obtaining function corresponding to the obtained address.

6. The character sequence drawing apparatus of claim 5, wherein one of the attributes shown by the common font metrics information is an average width of the plurality of glyphs, when the request receiving unit receives a request to obtain a width of the character sequence, the font processing function executing unit judges whether the address information of the glyph-by-glyph font metrics information obtaining function in the font access information corresponding to the font ID obtained by the request receiving unit is the null values or not, when the address information is the null values, the font processing function executing unit executes the common font metrics information to obtain an average width of the plurality of glyphs, calculates a width of the character sequence based on the average width, and sends a result of the calculation to the application program, and when the address information is not the null values, the font processing function executing unit executes the glyph-by-glyph font metrics information obtaining function to obtain glyph widths of characters included in the character sequence, calculates a width of the character sequence based on the obtained glyph widths, and sends a result of the calculation to the application program.

7. The character sequence drawing apparatus of claim 6, wherein the storage unit stores one or more character code conversion functions which are classified as a function type and each output one or more internal codes corresponding to one or more input character codes, each font pattern obtaining function outputs a font pattern of a glyph which is identified when one of the one or more internal codes is input, each piece of font access information includes an address of a character code conversion function in the storage unit, when the request receiving unit receives a request to draw a character sequence, the font processing function executing unit obtains from the application program one or more character codes that represent a drawing-object character sequence, obtains one or more internal codes by executing a character code conversion function using the one or more character codes, and obtains a font pattern for each character included in the drawing-object character sequence by executing a font pattern obtaining function using each of the one or more internal codes.

8. The character sequence drawing apparatus of claim 5, wherein each piece of font access information includes an address of a piece of font data in the storage unit, each font pattern obtaining function identifies a font pattern based on a piece of font data that is identified by an input address of the piece of font data, and when the request receiving unit receives a request to draw a character sequence, the font processing function executing unit draws the character sequence by obtaining an address of a piece of font data from a piece of font access information corresponding to the obtained font ID based on the received request, and executing a font pattern obtaining function using the address of the piece of font data.

9. The character sequence drawing apparatus of claim 2, wherein the storage unit stores one or more initialization functions which are classified as a function type and each initialize a rasterizer that generates a font pattern based on a piece of font data, each piece of font access information includes address information which is either an address of an initialization function in the storage unit or null values, and when it is possible for the font processing function executing unit to obtain an address of an initialization function based on the received request from a piece of font access information corresponding to the obtained font ID, the font processing function executing unit executes an initialization function corresponding to the obtained address.

10. The character sequence drawing apparatus of claim 9, wherein when the font access information obtaining unit obtains a piece of font access information, the font processing function executing unit judges whether address information of initialization function in the obtained piece of font access information is the null values or not, when the address information is not the null values, the font processing function executing unit initializes the rasterizer by executing the initialization function.

11. The character sequence drawing apparatus of claim 1, wherein the piece of font access information includes address information for each of the plurality of font processing functions, the address information being either an address of a corresponding font processing function in the storage unit or null values, and when address information of a font processing function included in a piece of font access information corresponding to the font ID obtained by the request receiving unit is not the null values, the font processing function executing unit executes the font processing function.

12. The character sequence drawing apparatus of claim 1 further comprising:

a reading unit operable to obtain font data and a font processing function from outside and store the obtained font data and the obtained font processing function in the storage unit; and an address managing unit operable to, upon receipt of a request from an application program, send an address of the font data or the font processing function to the application program.

13. The character sequence drawing apparatus of claim 1, wherein the font access information includes an address of a piece of font data in the storage unit, and when the request receiving unit receives a request to draw a character sequence, the font processing function executing unit identifies (1) addresses of one or more font processing functions corresponding to the request and (2) an address of a piece of font data based on the received request, and executes the font processing function using the address of the piece of font data.

14. A character sequence drawing method which uses a plurality of pieces of font data and a plurality of font processing functions for using the plurality of pieces of font data, the character sequence drawing method comprising:

storing a plurality of pieces of font data and a plurality of font processing functions, which are classified into a plurality of function types, for each of the plurality of function types;

obtaining a piece of font access information, which includes a group of addresses of font processing functions, from an application program, and one address for each of the plurality of function types;

assigning a font ID to each obtained piece of font access information;

holding the assigned font IDs and pieces of obtained font access information;

sending each font ID to the application program, wherein the font IDs correspond to the pieces of font access information on a one-to-one basis;

receiving a request, which is related to drawing of a character sequence, and a font ID from the application program;

identifying one or more addresses of font processing functions which have been predetermined with correspondence to the received request among a group of addresses of font processing functions included in a piece of font access information corresponding to the obtained font ID; and responding to the received request by executing one or more font processing functions corresponding to the one or more addresses.

15. A computer program that uses a plurality of pieces of font data and a plurality of font processing functions for using the plurality of pieces of font data, comprising instructions operable to cause a computer to:

store a plurality of pieces of font data and a plurality of font processing functions for using the plurality of pieces of font data wherein the plurality of font processing functions are classified into a plurality of function types, and store one or more font processing functions for each of the plurality of function types;

obtain from an application program a piece of font access information which includes a group of addresses of font processing functions and one address for each of the plurality of function types;

assign a font ID to each obtained piece of font access information, hold the assigned font IDs and pieces of obtained font access information, and send each font ID to the application program, wherein the font IDs correspond to the pieces of font access information on a one-to-one basis;

receive from the application program a request which is related to drawing of a character sequence, and a font ID; and identify one or more addresses of font processing functions which have been predetermined with correspondence to the received request among a group of addresses of font processing functions included in a piece of font access information corresponding to the obtained font ID, and respond to the received request by executing one or more font processing functions corresponding to the one or more addresses.

* * * * *